Dec. 25, 1956   J. E. WITZKY   2,775,232
VALVE ROTATOR
Filed June 19, 1953   2 Sheets-Sheet 1
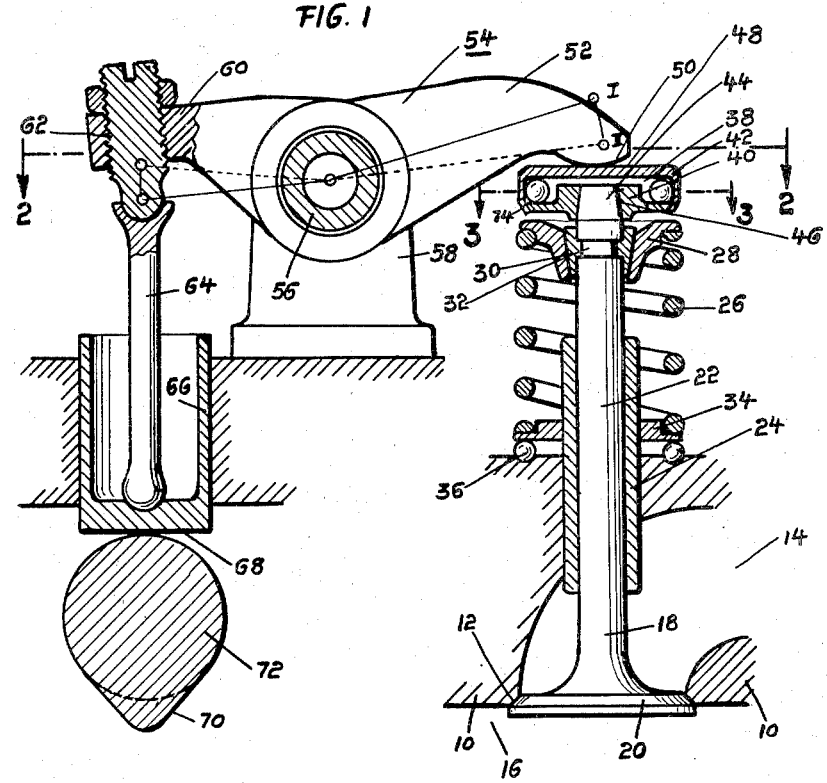
INVENTOR.
JULIUS E. WITZKY
BY Alfred E. Wilson
ATTORNEY.

Dec. 25, 1956 J. E. WITZKY 2,775,232
VALVE ROTATOR
Filed June 19, 1953 2 Sheets-Sheet 2
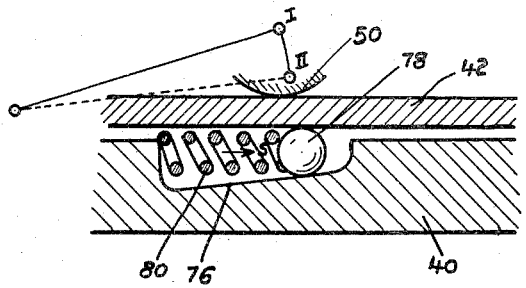
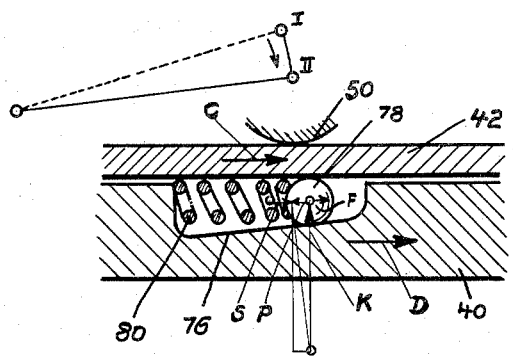
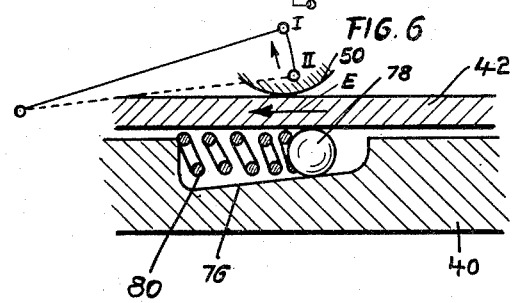
INVENTOR.
JULIUS E. WITZKY
BY Alfred T. Wilson
ATTORNEY.

United States Patent Office 2,775,232
Patented Dec. 25, 1956

2,775,232

VALVE ROTATOR

Julius E. Witzky, Royal Oak, Mich.

Application June 19, 1953, Serial No. 362,828

20 Claims. (Cl. 123—90)

This invention relates to valve actuating mechanisms for internal combustion engines, and more particularly to a valve clearance control device adapted to be positioned in the valve actuating gear at any desired point between the valve and its motion imparting means to yieldingly maintain zero clearance in the valve actuating gear and to automatically compensate for dimensional variations due to changes in operating temperatures. The invention also pertains to a valve cleaning device wherein the valve is slightly rotated with reference to its seat to displace foreign particles that might lodge between the valve and its seat.

In the operation of internal combustion engines it is customary to use valves, generally of the poppet type, to control the admission of air or other fluid to the cylinders of the engine, and to control the escape therefrom of exhaust gases or other products of combustion.

In the operation of engines employing poppet valves it is necessary, in order to insure high efficiency, that the valve contact its seat throughout its entire circumference, and that it be maintained in the fully closed position at all times except when it is supposed to be open. If a valve is held slightly open by its actuating gear, the compression pressure of the engine is reduced and its operating efficiency decreases. Also heated gases blowing past the edge of the valve burn the valve or its seat. It has therefore been customary to provide a degree of clearance in the valve actuating gear, such for example as between the end of the valve stem and the rocker arm or other member which engaged the valve stem to open the valve in opposition to the valve closing spring. The problem of providing suitable clearance between the valve stem and its actuating gear is of course complicated by the fact that when as the engine heats up due to operation of the engine, the elements of the valve gear and the valve itself expands due to the increase in temperature thereby reducing the effective clearance in the valve gear. It is therefore customary to adjust the clearance of the valve gear while the engine is hot to insure that at that time the valves will not be held in an open position. The presence of adequate clearance during hot engine operation results in the presence of more than a desired degree of clearance when the engine is cold, and this greater than desired clearance during cold operation results in a noisy engine due to the hammering of the various portions of the valve gear when the valves are actuated.

These problems exist in all internal combustion engines which utilize poppet valves regardless of whether or not the engines operate on the four cycle or the two cycle principles, or whether they employ spark ignition or are of the compression ignition or diesel type, or utilize a combination of these systems.

An object of this invention is to provide an automatically operating valve clearance adjusting mechanism which may be positioned in the valve gear at any desired point between the valve and the motion imparting mechanism for maintaining substantially zero clearance between the valve and its actuating gear, but insuring that the valve will at all times fully engage its seat when the valve is supposed to be closed.

Another object of the invention resides in the provision of a valve clearance control device wherein balls mounted on cam surfaces are employed to insure the maintenance of a desired clearance between the valve and its actuating gear under all engine operating conditions.

Still a further object of invention resides in the provision of an axially adjustable valve clearance control mechanism interposed between a valve and its actuating gear and having spring pressed balls movably mounted on cams to maintain substantially predetermined clearance between the valve and its actuating gear.

A further object of the invention resides in the provision of a valve clearance control mechanism wherein the valve actuating gear is maintained taut or embodies zero clearance regardless of dimensional variations due to changes in temperature due to operation of the engine.

Another object of the invention is to provide a zero clearance axially movable valve actuating mechanism wherein a plurality of spring pressed balls positioned on cam surfaces normally exert less thrust than the opposing valve closing springs but as the valve opening gear is actuated to open the valves, the axial thrust exerted by the spring pressed balls on their cam surfaces successively balance and then overcome the thrust exerted by the valve closing springs to move the valve in the opening direction.

Still a further object of my invention is to position a valve clearance adjusting device in a valve actuating gear, and wherein the force to actuate the valve is transmitted through spaced spring pressed balls positioned on cam surfaces to shift axially thereby to maintain zero clearance in the actuating mechanism, and wherein the balls move in a retrograde direction on the cams until the thrust exerted thereon by the springs with relation to the angles of the cam surfaces balance the force exerted by the spring employed to close the valve.

Another object is to provide a valve actuating mechanism embodying a valve cleaning arrangement wherein the valve is rotated slightly relative to its seat each time the valve is actuated.

Yet a further object of this invention is to provide a self cleaning valve construction wherein a valve actuator having relatively rotatable parts is interposed between the end of the valve stem and a portion of the valve actuating gear to rotate the valve slightly each time the valve is actuated.

Another object of my invention resides in the provision of a valve actuator having relatively rotatable parts wherein the valve may be rotated slightly each time the valve is actuated, the amount of valve rotation or movement being dependent upon the relative eccentricity or offset of contacting members.

Other objects and advantages of this invention will be apparent from the following description considered in conjunction with the accompanying drawings submitted for purposes of illustration only and not intended to define the scope of the invention, reference being had for that purpose to the subjoined claims.

In the drawings, wherein similar reference characters refer to similar parts throughout the several views:

Figure 1 is a somewhat diagrammatical sectional view through a portion of an engine embodying this invention.

Figure 2 is a plan view of the valve actuating mechanism.

Figure 3 is a sectional view taken substantially on the line 3—3 of Figure 1 looking in the direction of the arrows.

Figures 4, 5 and 6 are sectional views taken substantially on the line 4—4 of Figure 3 looking in the direction of the arrows, and showing the device in three successive operative positions.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to Figure 1, the invention is illustrated as applied to an internal combustion engine having a cylinder head portion 10. The engine may of course operate on any desired cycle, and may be of either the spark or compression ignition type. The cylinder head portion 10 has a valve seat 12 which serves to admit fluid either in the form of air or in the form of a combustible mixture or a combination thereof from a passage 14 to a combustion chamber 16 or to permit the escape of exhaust gases and other products of combustion from the combustion chamber 16 to atmosphere through the passage 14. A valve 18 having a head 20 and a stem 22 is slidably mounted in a sleeve or valve guide 24 secured in any desired manner in the cylinder head or the block of the engine or head.

A valve closing spring 26 surrounds the valve stem 22 and has its outer end seated in a spring retainer 28 secured to the valve stem 22 adjacent its outer end by a conical shaped split retaining member 30 having portions projecting into a groove 32 in the valve stem. The inner end of the valve closing spring 26 is seated in a spring retainer 34 mounted for rotation on a fixed portion of the engine cylinder, block or head. If desired the spring retainer 34 may be mounted on a series of balls 36 to facilitate its rotation as hereinafter more fully described. The spring 26 thus maintains the head 20 of the valve 18 securely closed against the valve seat 12 except when the valve is opened.

A valve clearance control device 38 having axially movable cage and cup members 40 and 42 is positioned on the upper or free end of the valve stem 22. The end of the valve stem 22 is preferably secured in the cage member 40 of the clearance control device 38 in a non-rotative manner as by having the conical end 44 of the valve stem 22 projecting into a conical recess 46 in the cage 40. The upper surface 48 of the cup 42 is substantially flat and is adapted to be contacted by the cam surface 50 of the actuating end 52 of a rocker arm 54 oscillatably mounted on a shaft 56 carried by a support 58 secured to the engine block or head. The rocker arm 54 is provided with a projection 60 connected through an adjusting mechanism 62 with a stem 64 of a cam follower 66 having a surface 68 adapted to be engaged and actuated by the working surface 70 of a cam member 72 journalled in the engine block or cylinder head or other portion of the engine. Any suitable motion transmitting linkage may be interposed between the cam member 72 and the cup portion of the valve clearance control device. It will also be understood that any convenient motion initiating means may be employed in lieu of the cam member 72.

The valve clearance control device 38 comprises a mechanism wherein the axial spacing of the cage 40 and the cup 42 is dependent on the load to which the device 38 is subjected. The cup 42 has a down turned flange 74 at its periphery to underlie the outer edge of the cage 40 to maintain the device 38 in assembled relation. A plurality of balls movable in cam surfaces are interposed between the cage 40 and the cup 42 of the device 38, and the balls are spring pressed in the direction to increase the axial spacing between the cage 40 and the cup 42. In the illustrated example of my invention the cage 40 has a plurality of circumferentially extending cam surfaces 76 illustrated in Figs. 3 to 6, each of which receives a ball 78 yieldingly urged by a spring 80 toward the shallow end of the cam surface 76 in the cage 40 to increase the axial spacing of the cage 40 and the cup 42 thereby taking up any clearance that exists in the valve gear. The balls 78 are so proportioned that the cup members 42 are always supported on the cage member 40 through the balls 78 in such a manner that the springs 80 are free to shift the balls up the cam surfaces to maintain zero clearance in the valve gear.

As the rocker arm 54 is moved by the cam member 72 and the intermediate valve gear in the valve opening direction, the balls 78 in the valve clearance control device 38 are subjected to a thrust which induces them to move down the cam surfaces 76 in the cage 40 in opposition to the force exerted by the springs 80 as the force exerted on the valve closing spring 26 increases. When an equilibrium of the thrust exerted by the plurality of balls 78 urged by their springs 80 with respect to the angular inclination of the cam surfaces 80 develops a sufficient force to balance force exerted by the valve closing spring 26, the valve 18 is moved in the opening direction.

If the valve 18 is an inlet valve the combustible mixture or other charge is admiltted to the combustion chamber 16, but if the valve 18 is an exhaust valve the products of combustion or other waste products are discharged or exhausted out the passage 14 and the usual exhaust system to the atmosphere.

As the cam 72 moves to release the rocker arm 54, the valve closing spring 26 urges the head 20 of the valve 18 into contact with its seat 12 thereby closing the combustion chamber 16. The springs 80 associated with the balls 78 urge the balls up the cam surfaces 76 thereby shifting the cap 42 axially relative to the cage 40 to take up clearance in the valve actuating gear to maintain substantially zero clearance in the system. Very silent engine operation is thus insured since no tapping or hammering of the valves takes place. In view of the fact that the valve gear is maintained tight at all times it is capable of more rapid actuation than is the case in valve gears wherein a considerable degree of clearance is interposed between the valve stem and the actuating portion of the rocker arm. Longer life of the valve and its gear are thus insured whereupon quieter and more desirable engine operation results.

In the operation of engines embodying my invention it will be noted that there is a relation between the axial force transmitted by the valve clearance control device 38 and the strength of the valve closing spring 26 which maintains the valve in its seated position. The axial force developed by the device 38 is dependent on the number and the angle of the cam surfaces 76 and the number and the strength of the springs 80. Either of these factors may be varied as desired to balance the force exerted by the valve closing spring 26. I have found that angles of 6° of the cams 76 operate very desirably in a particular installation, but it is to be understood that the angle of the cams 76 is not critical and may be varied through rather wide limits and correlated with the number of balls 78 and cams 76 employed and calibrated with reference to the strength of the springs 80 to insure desirable operating characteristics.

Referring to Figs. 4 to 6 it will be noted that Fig. 4 corresponds with the valve closed position, tappet on the base circle of the cam as shown in Fig. 1. The forces S of the springs 80 are pushing the balls 78 to the right up the cam surfaces 76 to take up any clearance between the valve and the cam. In Fig. 5 during the valve opening cycle the forces of the valve closing spring 26 force K moves the balls 78 first a small amount to the left down the race until there is equilibrium between the spring force S and the component P of the valve spring force K. This slight increment is necessary to compensate for any expansion in the valve gear.

The rocker arm is out of the center of the valve stem an amount indicated at 82 in Fig. 2. By moving the rocker arm from position I to II the rocker arm creates a torque indicated by arrow A in Fig. 2, and arrow C in Fig. 5 around the center of the valve axis. Due to the locking or one-way clutch action of the balls the valve 18 will rotate the same amount. The cage 40 and valve 18 rotate the same amount as indicated by arrow "D" in Fig. 5. During the closing cycle as illustrated in Fig. 6 when the rocker arm 54 moves from position II to I there is no longer a locking action and the cup 40 moves freely back as indicated by arrow B in Fig. 2 and arrow "E" in Fig. 6, leaving the valve in its closed position.

When the valve gear is actuated to move the valve 18 in the opening direction, the balls 78 shift slightly on their cam surfaces 76 thereby inducing a slight rotation between the cup 42 and the cage 40 as the force exerted by the rocker arm 54 increases to balance the tension exerted by the valve closing spring 26. As the point of equilibrium is reached the axial thrust developed by the device 38 overcomes the thrust exerted by the valve closing spring 26 whereupon the valve 18 is opened. When the cam 70 passes the dead center position with reference to the surface 68 of the cam follower 66, the rocker arm 54 is urged by the valve return spring 26 to close the valve. The valve clearance control device 38 thus acts in the manner of a one-way clutch to slightly oscillate or partially rotate the valve 18 on the bearings 36 when the valve is moved in the opening direction but when the load exerted by the rocker arm or other actuating mechanism is released the spring 26 urges the device 38 in the valve closing direction under conditions whereby no relative movement between the cage 40 and the cup 42 takes place. In a complete cycle of the cam, starting with the tappet on the base circle, the springs 70 are pushing the balls 78 up the cam surfaces 76 to take up any clearance between the end of the valve stem and the rocker arm cam. As the cam revolves and the valve is lifted off its seat, a slight movement down the race occurs until there is equilibrium between spring force and the component of the valve spring force. This movement is easy to control by the springs 80. This slight movement is necessary to compensate for any expansion in the valve gear. During the valve closing period, the springs 70 push the balls up the races 76, thereby eliminating all the clearance.

The point of engagement of the cam surface 50 of the actuating end 52 of the rocker arm 54 with the surface of the cup 42 of the valve clearance control device 38 may be shifted radially relative to the center of the cup 42 as illustrated by the dimension 82 on Fig. 2. The valve 18, its head 20, the valve closing spring 26 and the device 38 will be oscillated slightly on the ball bearing 36 between the spring retainer 34 and the block or engine cylinder when the valve actuating mechanism is operated to move the valve 18 in the opening direction. By shifting the point of contact of the cam surface 50 of the actuating end 52 of the rocker arm 54 radially outwardly relative to the center of the cup 42 as viewed in Fig. 2 the degree of rotation of the valve each time the valve is actuated by the rocker arm 54 will be increased. A controlled degree of movement of the valve is thus provided which assures self cleaning of the valve in a very economical and desirable manner.

The geometry of the rocker arm, with respect to valve movement, is an important item. The movement should be related to load in such a way that the greatest amount of slippage occurs under the highest loads, and minimum slippage takes place during acceleration. It is a rather common practice to divide the travel at the valve one-third of the valve lift above and two-thirds below the centerline of the rocker arm. This favorable rocker arm geometry is shown in Figs. 4 to 6.

The valve rotator is using this slippage between rocker arm and valve stem to its advantage to rotate the valve. By opening the valve the rocker arm moves from position I to position II illustrated in Figs. 1 and 4 to 6. If the rocker arm location is slightly out of the centerline 82 of the valve stem, this sliding rotation crates a movement of the cup 42 around the center line of the valve axis. During the opening cycle due to the locking action of the balls 78 the cage 40 will turn together with the cup 42 and because the valve is fastened to the cage 40, the valve will rotate too. During the closing cycle when the rocker arm 54 moves from point II to point I, there is no longer a locking action between cage 40 and the cup 42, it is free wheeling. The cup 42 moves back leaving the valve in its turned position. If the turning force of the rocker arm movement is not great enough to overcome the friction between valve spring and cylinder head, an antifriction bearing 36 has to be provided.

There is a second force responsible for the turning action of the valve around its axis. During the opening of the valve when the friction between the cup 42 and the rocker arm 50 is higher than the ball friction between the cage 40 and the cup 42, the reaction force F of the valve spring component P moves the cage 40 to the right as indicated by the arrow D, Fig. 5. During the closing cycle the balls 78 are free-wheeling back to their original position, leaving the valve in its turned position. If only this force for turning the valve is applied, the rocker arm can be in the valve stem centerline.

If the turning force of the rocker arm movement or the reaction force F is not great enough to overcome the friction between valve spring and cylinder head, an antifriction bearing must be provided.

Removing the back lash in the valve train increases valve gear life, freedom from adjustment, increased flexibility in cam design and quietness.

To rotate the valve, many beneficial effects can be obtained. The stem and guide will be kept free of deposits, thereby preventing sticking. Rotation will impart a wiping action between the valve face and valve seat and in return will prevent valve burning.

My zero clearance valve rotator combines all these advantages in one unit.

It will of course be apparent that my combined valve clearance control and valve cleansing device 38 may be acted upon directly by a cam such as the cam 70 on the cam shaft 72 rather than through the intermediary of a valve actuating gear. Also any other type of valve actuating mechanism may be employed wherein an axial thrust is exerted on the valve clearance control device 38 by any suitable motion transmitting means to shift the valve 18 in the opening direction.

It will be apparent that various changes in the specific actuating mechanism may be made without departing from the spirit of my invention. For example, the cam surfaces 76 may be positioned in either of the telescoping members, and the positioning of the springs 80 may be modified as desired.

I claim:

1. A valve actuating mechanism for an engine having a freely rotatable poppet valve including a stem comprising a cage secured to the valve stem to rotate in unison therewith and a cup positioned on the cage and movable axially relative thereto, cooperating cam surfaces between the cage and cup, a series of balls positioned in the cams, and a spring associated with each ball to maintain it in contact with its associated cam surfaces, and motion transmitting means engaging the cup non-concentrically of the valve stem.

2. In an internal combustion engine having a piston slidably mounted in a cylinder and defining a combustion chamber, a valve including a stem controlling the admission of fluid to the combustion chamber, yielding means urging the valve toward the closed position, motion transmitting means to move the valve in the opening direction, a valve clearance control mechanism interposed in the motion transmitting means and comprising members movable relative to each other in a telescoping manner, cam surfaces between said members, balls positioned in the cams, and yielding means urging the balls into engagement with said members, the thrust transmitted by the clearance control mechanism overcoming the yielding means urging the valve toward the closed position as the motion transmitting means is moved in the valve opening direction.

3. A valve rotating mechanism for an engine having a freely rotatable poppet valve including a stem comprising a cage secured to the valve stem and a cup positioned on the cage and movable rotationally relative thereto, cam actuated spring pressed balls between the cage and cup, an actuating member having a cam surface engaging the cup to actuate the valve, the cam being offset relative to the center of the cup to exert a force on the cup to partially rotate the valve as the cam surface moves relative to the cup to move the valve in the opening direction.

4. In an internal combustion engine having a piston slidably mounted in a cylinder and defining a combustion chamber, a valve including a stem controlling the admission of fluid to the combustion chamber, yielding means urging the valve toward the closed position, motion transmitting means to move the valve in the opening direction, a valve clearance control mechanism interposed in the motion transmitting means and comprising a cage secured to the stem of the valve and a cup positioned on the cage, the cage and cup being movable relative to each other in a telescoping manner, cam surfaces between said cage and cup, balls positioned in the cams, and yielding means urging the balls into engagement with the cage and cup to exert an axial thrust to overcome the force exerted by the yielding means urging the valve toward the closed position as the motion transmitting means is moved in the valve opening direction.

5. A valve clearance control device for an internal combustion engine comprising telescoping members having spring pressed cam actuated balls positioned in a valve gear between a force transmitting member and a rotatable valve stem to exert an axial thrust to overcome the force exerted by a valve closing springs, one of said members being secured to the valve stem and the other of said members being engaged eccentrically of the valve stem by the force transmitting member, the angle of the cam surfaces and the thrust exerted by the yielding means being subject to variation to vary the thrust exerted by the clearance control device.

6. A valve clearance and rotating device for a freely rotatable poppet valve of an engine comprising a cage secured to the stem of the valve to move in unison therewith, a cup mounted on the cage and movable axially and rotationally relative thereto, yielding means urging the cup and cage in the separating direction, force transmitting means between the cup and cage, and motion transmitting means engaging the cup members non-concentrically.

7. In an actuating mechanism for a poppet valve having a stem, a cage secured to the stem, a cup mounted on the cage and movable axially and rotationally relative thereto, one-way motion transmitting means between the cage and cup, yielding means between the cage and cup, the point of contact between the cup and a force transmitting mechanism being non-concentric relative to the cup whereby the cage and the valve stem are oscillated slightly when the valve actuating mechanism is operated.

8. An actuating mechanism for a poppet valve having a stem, comprising a cage secured to the stem, a cup mounted on the cage and movable rotationally relative thereto, one-way motion transmitting means between the cage and cup, the point of contact between the cup and a force transmitting mechanism being non-concentric relative to the cup whereby the cage is oscillated slightly when the valve actuating mechanism is operated.

9. A rotatable poppet valve clearance control device for an internal combustion engine comprising axially movable members having cooperating cam surfaces therebetween, spring pressed balls operably positioned in said cam surfaces, said device being adapted to be positioned in a valve gear between a force transmitting member and a valve stem, one of said members being secured to the valve stem to rotate in unison therewith and the other of said members being engaged eccentrically of the valve stem by said force transmitting member.

10. In an internal combustion engine having combustion chambers, freely rotatable poppet valves having stems controlling the admission of fluid to the combusion chambers, and motion transmitting means to actuate the valves, the combination therewith of valve rotating and clearance adjusting means comprising members movable axially and rotationally relative to each other positioned in the motion transmitting means, an actuating member having cam means to engage the valve rotating member to actuate the valve, the mean path of contact of the cam means relative to said member being offset to produce an eccentric thrust to partially rotate the valve as the motion transmitting means is actuated.

11. A valve clearance regulator for the rotatable poppet valves of an internal combustion engine having a valve gear to actuate the valves, axially movable cup and cage members positioned in the valve gear, the cage members being secured to the valves to rotate in unison therewith, yielding means urging the cup and cage members toward an elongated position, and thrust transmitting means comprising spring pressed cam actuated balls interposed between the cup and cage members, and motion transmitting means engaging the cup members non-concentrically.

12. In an internal combustion engine, a rotatable poppet valve, a spring urging the valve toward a closed position, valve actuating means to exert thrust to move the valve in the opening direction, a valve control device interposed directly between the poppet valve and the valve actuating means to transmit thrust from the valve actuating means to the poppet valve and comprising axially movable members, cam means between said axially movable members, said cam means being so constructed and arranged that axial movement of said members is accompanied by rotational movement of said members relative to each other to effect rotational movement of the valve.

13. In an internal combustion engine, a rotatable poppet valve, a spring urging the valve toward a closed position, valve actuating means to exert a force to move the valve in the opening direction, a valve control device interposed directly between the poppet valve and the valve actuating means to transmit the force from the valve actuating means to the poppet valve and comprising members rotatably mounted relative to each other, cam means between said rotatably mounted members, said cam means being so constructed and arranged that rotational movement of said members is accompanied by axial movement of said members relative to each other to control the clearance between the valve and the valve actuating means.

14. In a valve gear, a rotatable poppet valve, yielding means urging the valve toward a closed position, an actuating member to exert a force to move the valve in the opening direction, valve rotating and clearance adjusting means interposed between the valve and said actuating member to transmit the force from the actuating member to the valve and comprising members movable axially and rotationally relative to each other, and yieldingly actuated cam means between said members whereby axial movement of said members transmits rotational movement to said valve.

15. In an engine having combustion chambers, rotatable poppet valves movable between closed and open positions controlling the flow of fluid to and from the combustion chambers, yielding means urging the valves toward the closed positions, thrust exerting valve gear means to urge the valves toward the open positions, thrust transmitting valve rotating and clearance regulating means comprising relatively movable members interposed directly between the valves and the valve gear means, spring pressed cam means between said relatively movable members to yieldingly transmit thrust from the valve gear means to the valves accompanied by an axial shifting and a rotational movement of said relatively movable members.

16. In an internal combustion engine having a rotatable poppet valve having spring means urging the valve toward a closed position and a thrust exerting valve gear to move the valve toward an open position, a valve rotator and actuator comprising members telescopingly and rotatably mounted relative to each other and interposed directly between and transmitting thrust from the thrust exerting valve gear to the valve, and spring actuated cam means between said telescopingly mounted rotatable members to yieldingly transmit thrust from the valve gear to move the valve toward the open position and to rotate the valve a short distance between successive closed position cycles of operation.

17. In an engine having a combustion chamber, a rotatable poppet valve movable between closed and open positions controlling the flow of fluid to or from the combustion chamber, yielding means urging the valve toward the closed position, motion transmitting means to move the valve toward the open position, relatively movable members interposed directly between the motion transmitting means and the valve, cam means between said relatively movable members, and spring pressed balls associated with said cam means to yieldingly transmit thrust from the motion transmitting means to the valve accompanied by an axial shifting and a rotational movement of said relatively movable members.

18. In an engine having combustion chambers, rotatable poppet valves movable between closed and open positions controlling the flow of fluid to and from the combustion chambers, yielding means urging the valves toward the closed positions, thrust exerting valve gear means to urge the valves toward the open positions, thrust transmitting valve clearance regulator means comprising relatively movable members interposed directly between the valves and the valve gear means, spring pressed cam means between said relatively movable members to transmit thrust from the valve gear means to the valve accompanied by an axial shifting of said relatively movable members.

19. A valve actuator and clearance adjustment regulator for a rotatable poppet valve of an engine having spring means urging the valve toward a closed position and a thrust exerting valve gear to move the valve toward an open position in opposition to the spring means, comprising telescopingly mounted rotatable members interposed directly between and transmitting thrust directly from the valve gear to the valve, and spring pressed cam means between said telescopingly mounted rotatable members to yieldingly transmit thrust from the valve gear to move the valve toward the open position.

20. A valve rotator and clearance regulator for a rotatable poppet valve of an engine having spring means urging the valve toward a closed position and a thrust exerting mechanism to move the valve toward an open position in opposition to the spring means, comprising telescopingly mounted rotatable members interposed directly between and transmitting thrust from the thrust exerting mechanism to the valve, and spring pressed cam means between said telescopingly mounted rotatable members to yieldingly transmit thrust from the thrust exerting mechanism to move the valve axially toward the open position and to slightly rotate the valve.

References Cited in the file of this patent

UNITED STATES PATENTS

| 2,532,346 | Stancliff | Dec. 5, 1950 |
| 2,572,106 | Burrell | Oct. 23, 1951 |
| 2,624,323 | Thorne | Jan. 6, 1953 |

FOREIGN PATENTS

| 238,901 | Switzerland | Dec. 29, 1943 |